Figure 1:
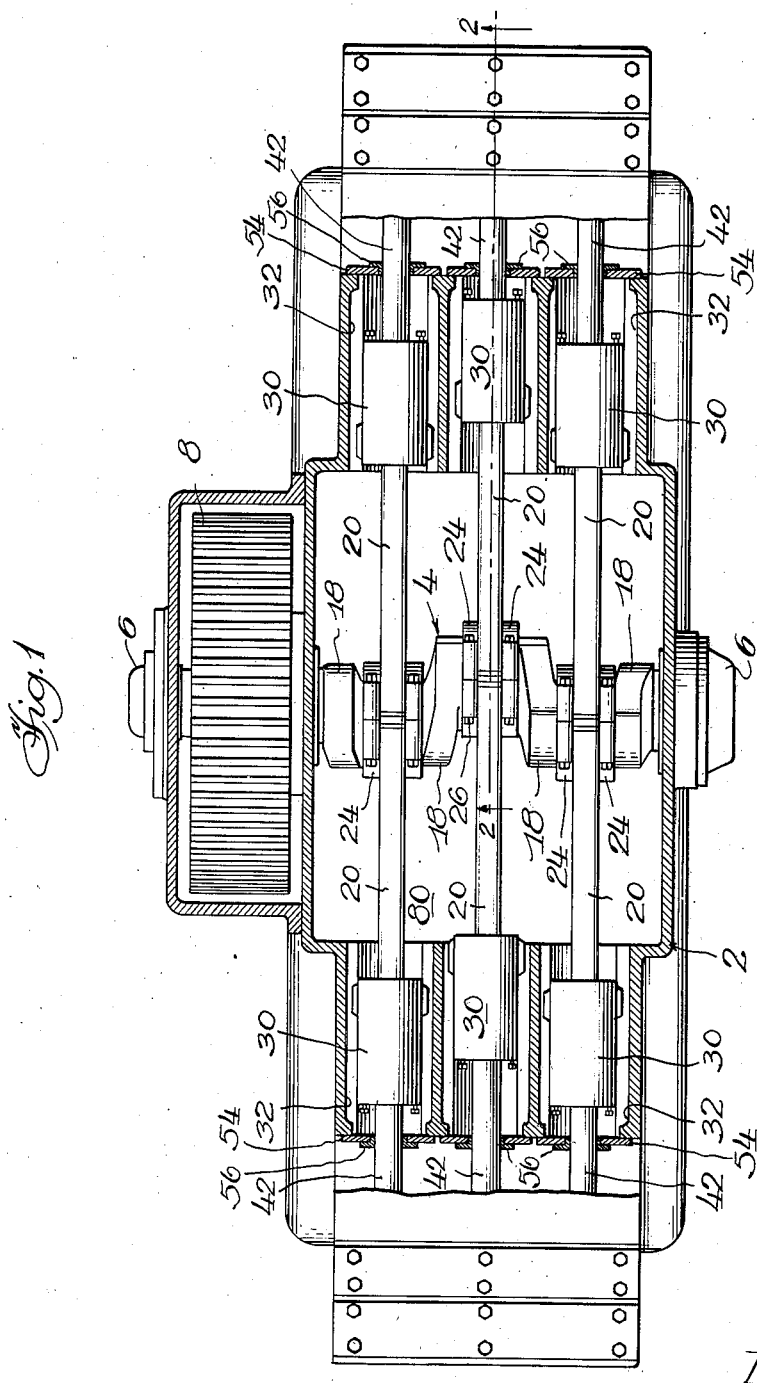

Feb. 8, 1949.    R. J. HESS    2,461,056
CONNECTING ROD AND PLUNGER CONNECTION
Filed March 29, 1943    2 Sheets-Sheet 2
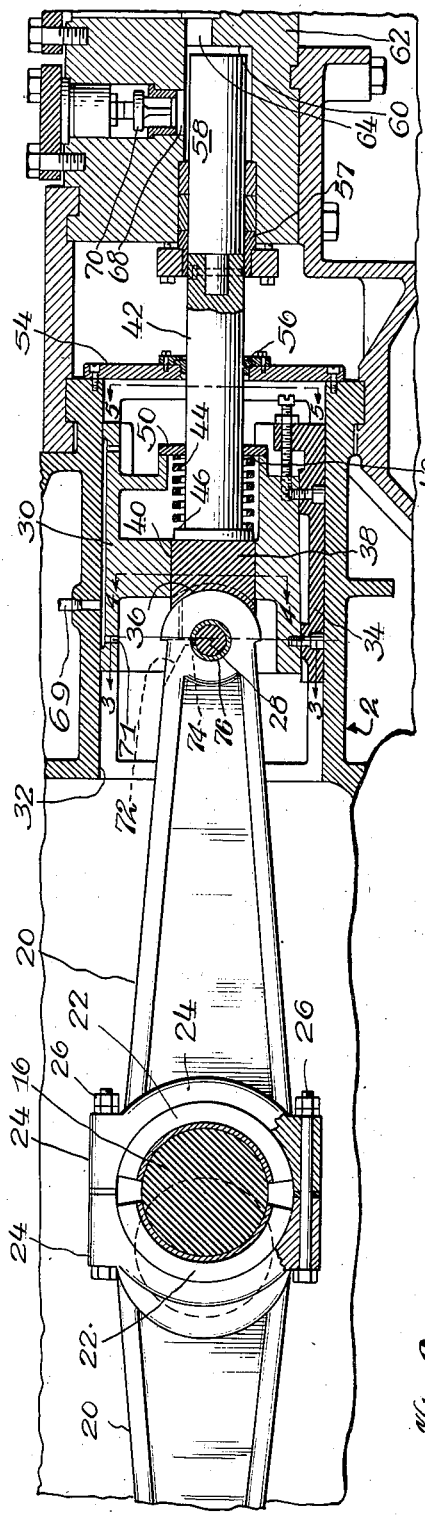
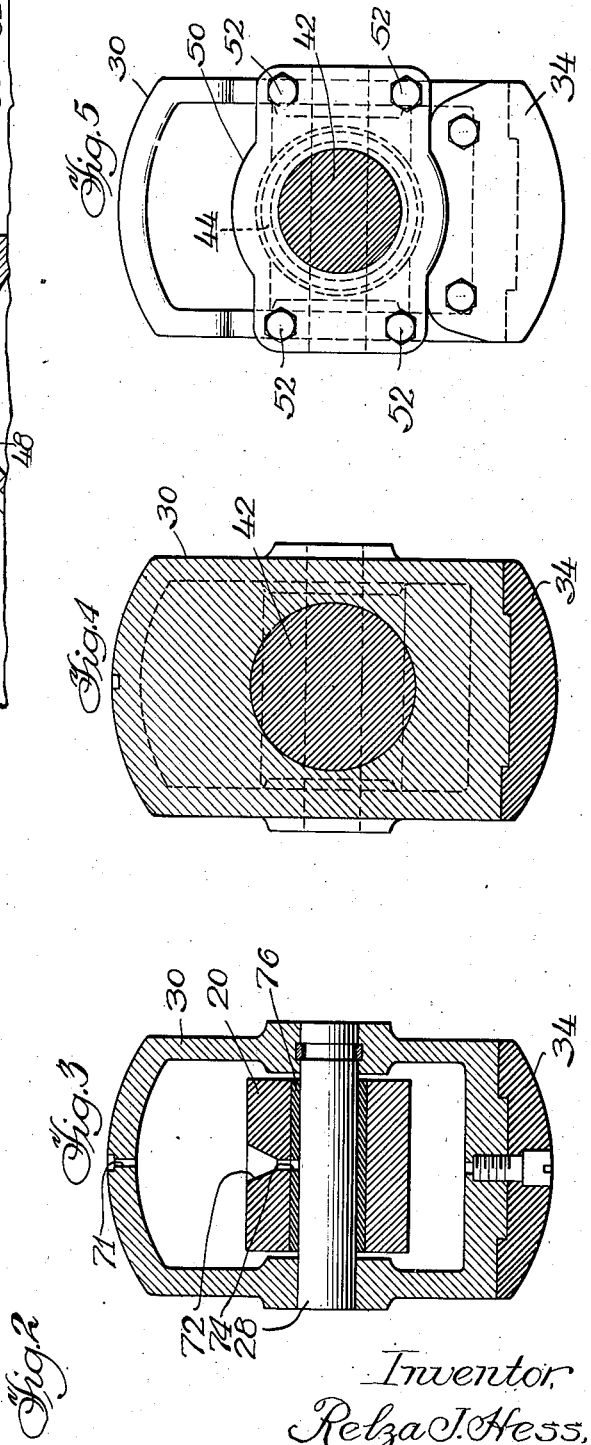

Patented Feb. 8, 1949

2,461,056

UNITED STATES PATENT OFFICE 2,461,056

CONNECTING ROD AND PLUNGER CONNECTION

Relza J. Hess, Chicago, Ill., assignor to American Steel Foundries, Chicago, Ill., a corporation of New Jersey Application March 29, 1943, Serial No. 480,888

11 Claims. (Cl. 74—44)

My invention relates to pumps and more particularly to a high pressure pump for furnishing under constant pressure a supply of liquid, such as water.

My novel pump is of the type in which a crankshaft is housed within a frame and is operable by means of a plurality of connecting rods to actuate a plurality of associated plungers, said plungers being reciprocal within associated chambers or cylinders to discharge therefrom a supply of water under substantially constant pressure.

A primary object of my invention is to provide a novel connection between each connecting rod and associated crosshead and plunger, said connection comprising a self take-up bearing between the rod and the plunger, thus eliminating the conventional bearing between the crosshead and plunger.

In the drawings, Figure 1 is a top view of the novel pump with the frame broken away and the pump parts within the frame shown in top plan view. Figure 2 is an enlarged fragmentary sectional view taken on the line 2—2 of Figure 1 with portions of the device shown in elevation to clarify the illustration. Figure 3 is a sectional view on the line 3—3 of Figure 2. Figure 4 is a sectional view taken on the line 4—4 of Figure 2. Figure 5 is a sectional view taken on the line 5—5 of Figure 2.

Describing my invention in detail, a body or frame, generally designated 2, houses a crankshaft, generally designated 4 (Figure 1), said shaft being supported by roller bearing assemblies 6, of conventional design, and said shaft being connected adjacent one end thereof to a main gear 8 operatively associated with associated driving means (not shown). The crankshaft 4 comprises one or more crank pins 16 connected to each other by means of cheeks 18, said pins being offset from the rotational axis of the crankshaft 4 and being spaced thereabout. It will be understood that any desired number of pins may be utilized.

Each crank pin 16 drives a pair of horizontally opposed connecting rods 20 comprising bearing portions 22 (Figure 2) journaled on said pin and secured thereto by means of a pair of split clamping rings 24 maintained in assembly by bolt and nut assemblies 26. Each connecting rod 20 is pivotally connected by means of a bushed wrist pin 28 to a crosshead 30 reciprocal within a crosshead guide 32, said crosshead being provided on the bottom thereof with a shoe or slipper 34 of conventional form, and the end of each rod 20 remote from the crankshaft is in complementary convex, concave engagement at 36 (Figure 2) with a thrust block 38 slidably mounted at 40 within the crosshead 30, said block being secured or formed on the adjacent end of an associated plunger 42 to form a portion thereof, thereby defining a reciprocal unit therewith. A spring 44, herein illustrated as a coil spring, is sleeved over said plunger and seated at one end at 46 (Figure 2) against a shoulder thereon and at the opposite end at 48 against a spring plate 50 mounted at 52 (Figure 5) on the crosshead 30, said spring serving to maintain the connecting rod and the block 38 in tight engagement at 36.

A cover plate 54 is mounted on each crosshead guide and supports packing means 56 for wiping engagement with the associated plunger 42.

Each plunger is provided with a preferably removable end portion 58 reciprocal within a pump chamber or cylinder 60 formed in a block 62 mounted on the frame 2. The block is provided with packing means 57 for the plunger. Each chamber communicates with an inlet passage 64 (Figure 2) and with an outlet passage 68 having conventional one-way outlet valve means 70. The crosshead guide 32 is preferably provided with an oil line 69 (Figure 2) by means of which oil may be supplied to a crosshead port 71 from which the oil may drop into a notch 72 of the rod 20 and may flow from the notch into a port 74 of a bushing 76 on the pin 28 to lubricate the connection between the pin and the rod 20.

I claim:

1. In a device of the class described a frame, a crosshead slidably guided by said frame, a reciprocal connecting rod pivotally connected to said crosshead, a plunger actuated by said rod and having a portion in complementary arcuate thrust engagement therewith, and resilient means reacting against said crosshead and said plunger for maintaining the latter in tight engagement with said rod.

2. In a device of the class described, a frame, a crosshead slidably supported thereby, a connecting rod pivotally connected to said crosshead and adapted for connection to associated actuating means, a plunger adapted to be actuated by said rod and having a portion in complementary arcuate thrust engagement therewith, and resilient means bearing against abutment means on said plunger for maintaining the same in tight engagement with said rod.

3. In a device of the class described, a frame, a crosshead slidably supported thereby, a connecting rod pivotally connected to said crosshead and adapted for connection to associated actuating means, a plunger adapted to be actuated by said rod and having a portion in complementary arcuate thrust engagement therewith, and resilient means under compression and reacting at respective ends thereof against abutment means on said plunger and crosshead respectively, whereby said plunger and said rod are tightly maintained in said thrust engagement.

4. In a device of the class described, a frame, a crosshead slidably supported thereby, a connecting rod pivotally connected to said crosshead and adapted for connection to associated actuating means, a plunger adapted to be actuated by said rod and having a portion in complementary arcuate thrust engagement therewith, and resilient means sleeved over said plunger and reacting thereagainst and against abutment means on said crosshead.

5. In a device of the class described, a frame, a crosshead slidably supported thereby, a connecting rod member, a plunger member having a portion in complementary arcuate thrust engagement with said rod member, one of said members being pivotally connected to said crosshead, and resilient means reacting against the crosshead and the other member for maintaining said members in said thrust engagement.

6. In a device of the class described, a frame, a crosshead slidably supported thereby, a connecting rod member, a plunger member having a portion in complementary arcuate thrust engagement with said rod member, one of said members being pivotally connected to said crosshead, and resilient means sleeved over the other member in abutment therewith and with a portion of the crosshead for maintaining said members in said engagement.

7. In a device of the class described, a pair of separable members in direct complementary arcuate thrust engagement at corresponding ends thereof, means for maintaining said members in said engagement, said means comprising a crosshead formed and arranged for slidable support from an associated frame, a pivotal connection between said crosshead and one of said members, and resilient means reacting against said crosshead and the other member.

8. A crosshead assembly comprising a crosshead, a connecting rod member connected to said crosshead for actuation thereof, a reciprocal member having a portion in direct thrust engagement at one end thereof with an end of the rod member, and resilient means operatively associated with said members for maintaining the same in said thrust engagement.

9. A crosshead assembly comprising a movable crosshead, a connecting rod member operatively connected to said crosshead for actuation thereof, said member being adapted for connection to associated actuating means, a reciprocal member having a portion in direct thrust engagement with said rod member, and resilient means operatively associated with said members for maintaining the same in said thrust engagement.

10. A crosshead assembly comprising a movable crosshead, a connecting rod member operatively connected to said crosshead for actuation thereof, said member being adapted for connection to associated actuating means, a reciprocal member having a portion in direct complementary arcuate thrust engagement with said rod member, and resilient means operatively associated with said members for maintaining the same in said thrust engagement.

11. In a device of the class described, a frame, a crosshead slidably supported thereby, a reciprocal unit comprising a plunger and a block secured thereto, said block being slidably fitted in said crosshead for support thereby, a connecting rod having a portion in complementary arcuate thrust engagement with said block for actuation of said unit, and resilient means reacting against the crosshead and said unit for maintaining said block and said portion in said thrust engagement.

RELZA J. HESS.

REFERENCES CITED

The following references are of record in the file of this patent:

UNITED STATES PATENTS

| Number | Name | Date |
| --- | --- | --- |
| 794,281 | Clapp | July 11, 1905 |
| 876,758 | Wolf | Jan. 12, 1908 |
| 1,432,041 | Scott | Oct. 17, 1922 |
| 1,492,019 | Colony | Apr. 29, 1924 |
| 1,586,307 | Hildebrand | May 25, 1926 |
| 2,006,879 | Benedek | July 2, 1935 |
| 2,171,554 | Hedges | Sept. 5, 1939 |
| 2,212,366 | Donaldson | Aug. 20, 1940 |
| 2,335,362 | Schroepfer | Nov. 30, 1943 |